United States Patent [19]

Boyer

[11] Patent Number: 5,129,473
[45] Date of Patent: Jul. 14, 1992

[54] FAN/RADIATOR COMBINATION FOR SNOWMOBILE WITH LIQUID COOLED ENGINE

[75] Inventor: Kirk A. Boyer, Lino Lakes, Minn.

[73] Assignee: Yamaha Hatsudoki Kabushiki Kaisha, Iwata, Japan

[21] Appl. No.: 629,448

[22] Filed: Dec. 18, 1990

[51] Int. Cl.⁵ .................................. B62D 27/00
[52] U.S. Cl. .................................. 180/68.1; 60/321; 180/68.4
[58] Field of Search ............... 123/41.57, 41.72; 60/321; 180/309, 68.1, 68.4, 68.3

[56] References Cited

U.S. PATENT DOCUMENTS

| | | | |
|---|---|---|---|
| 3,357,413 | 12/1967 | Quinton | 123/41.57 X |
| 3,901,335 | 8/1975 | Johnson | 180/190 |
| 4,008,777 | 2/1977 | Juto et al. | 180/190 |
| 4,249,626 | 2/1981 | Fields et al. | 180/68.4 X |
| 4,337,733 | 7/1982 | Hirata et al. | 123/41.1 |
| 4,340,123 | 7/1982 | Fujikawa | 180/54.1 |
| 4,604,974 | 8/1986 | Watanabe | 123/41.57 |
| 4,711,088 | 12/1987 | Berchem et al. | 60/321 |

*Primary Examiner*—Andres Kashnikow
*Assistant Examiner*—Michael Mar
*Attorney, Agent, or Firm*—Haugen and Nikolai

[57] ABSTRACT

An improved liquid cooled heat management system for a snowmobile vehicle is described. To maintain the under-the-hood air temperature at optimum operating values while providing the necessary cooling for the vehicle's internal combustion engine, an air inlet opening is formed in the hood or other body panel of the snowmobile defining the engine compartment and disposed within this engine compartment is an appropriately sized heat exchanger through which the liquid coolant is made to flow when the engine is running. The air inlet opening in the hood or body panel leads into a duct or shroud designed to enclose the heat exchanger or radiator on the fan suction side and a engine-driven fan also disposed within the duct draws outside air through the heat exchanger at a rate that is directly related to engine speed. Because of the manner in which the duct work is structured, warmer, under-the-hood air is effectively isolated from the stream of cold outside air drawn through the heat exchanger. Furthermore, the engine's exhaust manifold is also liquid-cooled which further enhances the overall efficiency of the system.

5 Claims, 3 Drawing Sheets

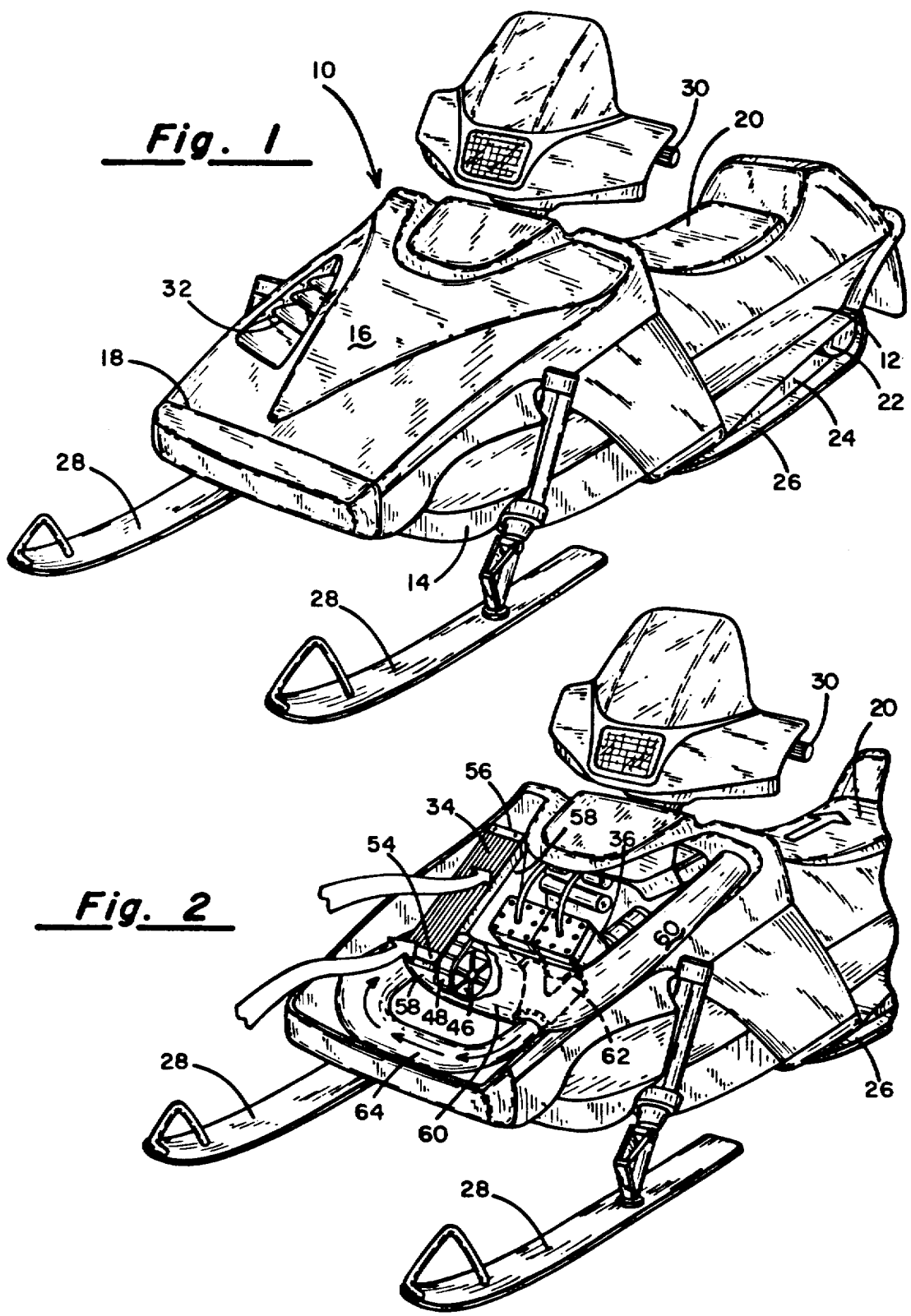

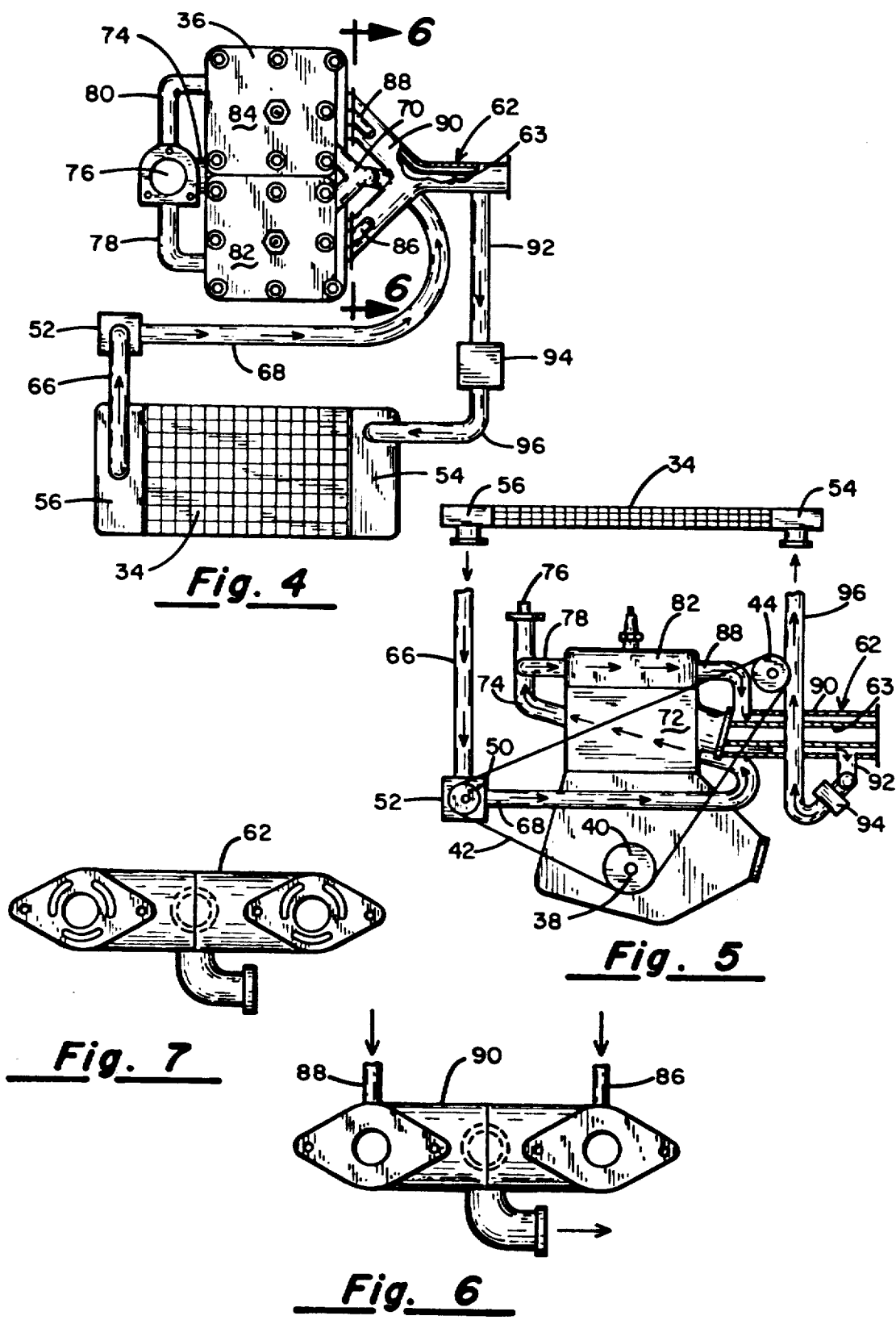

FAN/RADIATOR COMBINATION FOR SNOWMOBILE WITH LIQUID COOLED ENGINE

BACKGROUND OF THE INVENTION

I. Field of the Invention

This invention relates generally to snowmobile-type recreational vehicles, and more particularly to an improved cooling system for such vehicles where the cooling capacity is directly proportional to engine power, allowing a more consistent engine temperature control under varying ambient conditions.

II. Discussion of the Prior Art

Various approaches are known in the art for cooling the internal combustion engine used to power snowmobile-type vehicles. In a first arrangement in the case of low horse power machines, the engine may be totally air-cooled by providing an appropriate opening in the engine cowl so that as the vehicle moves through the snow, air is rammed through the opening and made to flow across the exposed exterior surfaces of the engine. When idling or when travelling through deep snow, the ground speed of the vehicle may be such that insufficient air flows over the engine surfaces to provide adequate cooling and an over-temperature condition will frequency arise. This method is wholly unsuited for current machines due to sound level restrictions.

Another known cooling system is disclosed in U.S. Pat. No. 4,340,123 assigned to Kawasaki incorporates a liquid coolant heat exchanger which extends along the tunnel of the snowmobile at a location above the track assembly and below the seat. A combination of air flow and melting snow splashed onto the heat exchanger by the drive track carries the heat away from the recirculating coolant pumped through the coolant passages formed in the engine. Systems of this type which rely on a snow-splash cooled heat exchangers are dependent on outside conditions and not the cooling load and, therefore, do not maintain a constant temperature range under varying ambient conditions. For example, when traversing compacted snow or ice, very little snow is splashed by the drive track onto the heat exchanger and, accordingly, heat removal is achieved solely by the air which is made to pass over the heat exchanger. Again, if the vehicle is being driven at a slow speed for a prolonged time interval, say, over a frozen lake, overheating can occur due to the inability of the heat exchanger to dissipate all of the heat generated by the engine. Moreover, systems such as disclosed in the aforereferenced Kawasaki patent often result in slush freezing on the tunnel surfaces and track suspension member, increasing the weight of the machine and adversely affecting performance. Moreover, with the heat exchanger disposed in the snowmobile's tunnel, the clearance between the drive track and the heat exchanger reduces the suspension stroke available, making it difficult to provide a comfortable ride.

The Fields et al. U.S. Pat. No. 4,249,626 also assigned to Kawasaki describes a snowmobile having a liquid-cooled engine with a radiator element positioned in front of a hood louver whereby air entering through the louvers as the machine is being driven passes through the radiator to extract the heat from the coolant liquid. Again, this type of design suffers from the fact that the amount of cooling provided is dependent to a large extent on ambient conditions, such as speed of travel, snow conditions, etc. and not to the power being generated by the vehicle's internal combustion engine. The amount of venting required to introduce the necessary cooling air also compounds the problem of snowmobile engine noise emissions and, accordingly, it is generally desirable to reduce, as much as possible, the area of openings in the vehicle's cowl or hood.

The prior art has also failed to adequately address a major heat source located beneath the vehicle's hood. More specifically, it is found that the engine's exhaust manifold, sometimes referred to as a "Y-pipe" in the case of a two cylinder engine, is a major source of under-the-hood heating Unless proper attention is paid to under-hood temperatures, such problems as vapor lock, heat bogging, and shortening of V-belt life occur.

OBJECTS

It is accordingly a principal object of the present invention to provide an improved heat management system for a snowmobile-type vehicle which is relatively independent of outside ambient conditions.

Another object of the invention is to provide a heat management system for a snowmobile allowing improved performance by way of consistent power, improved throttle response, reduced noise emissions and less down-time.

SUMMARY OF THE INVENTION

The foregoing features, objects and advantages are achieved in accordance with the present invention by providing a radiator-type heat exchanger disposed beneath the hood in the engine compartment of the snowmobile and with a fan and water pump driven by the engine. A duct or shroud is provided about the air inlet opening in the hood or body, the radiator and the fan in such a way that only cold outside air is drawn through the radiator with warmer, under-the-hood air effectively isolated. The water pump circulates liquid coolant through the engine and its exhaust manifold and then through the radiator where the heat is given off to the air stream flowing through the shroud and fan. By providing the fan and shroud arrangement in combination with the radiator, sufficient heat exchanger efficiency is provided to permit a closed or recirculating cooling system to be used to cool both the engine and the exhaust manifold.

Given the size constraints associated with the snowmobile's engine compartment, it is through the ducting arrangement that a relatively small radiator can be used while still providing sufficient heat transfer capability to maintain the engine and exhaust manifold cool enough so that problems due to vapor lock and bogging do not occur.

Furthermore, in the system of the present invention, both the fan speed and the engine power are proportional to engine rpm. Hence, the cooling capacity is also proportional to engine power, allowing more consistent temperature control under varying ambient conditions, such as outside temperature, altitude, snow depth, etc.

Since only a single opening need be made through the hood or through a side panel of the body to allow the introduction of cold outside air into the ducting system surrounding the radiator and fan and because the ducting system effectively isolates the cold air inlet opening from the engine, noise emissions through the cold air inlet opening are minimized.

Still a further advantage emanating from the improved cooling system configuration of the present invention is that all metal surfaces under the hood are effectively maintained at a sufficiently low temperature that plastic parts may be brought into close proximity with those surfaces without damage to those parts due to melting. As such, the size of the engine compartment can be reduced for styling considerations without fear that over-crowding will result in parts failure.

Those skilled in the art will recognize that automotive cooling systems have incorporated radiator/fan combinations for removing heat energy from a liquid coolant, but in the case of automobiles, under-the-hood space constraints tend not to be a limiting factor. Automobile cooling systems also rely on ram air impinging on the radiator surface for cooling at travel speeds with the fan providing the air flow at low or idle speeds.

DESCRIPTION OF THE DRAWINGS

The foregoing features, objects and advantages of the invention will become apparent to those skilled in the art from the following detailed description of a preferred embodiment, especially when considered in conjunction with the accompanying drawings in which like numerals in the several views refer to corresponding parts.

FIG. 1 is a perspective view of a snowmobile vehicle in which the heat management system of the present invention is incorporated;

FIG. 2 is a partial perspective view of the snowmobile of FIG. 1 with the hood or cowl removed to allow viewing of the engine and portions of its cooling system;

FIG. 4 is a schematic mechanical drawing showing the liquid coolant flow path;

FIG. 5 is a side elevation of the snowmobile engine and the liquid coolant flow path;

FIG. 6 is a cross-sectional view taken along the lines 6—6 in FIG. 4;

FIG. 7 is a drawing showing an alternative way of providing a water cooled exhaust manifold

DESCRIPTION OF THE PREFERRED EMBODIMENT

Figure 3A:
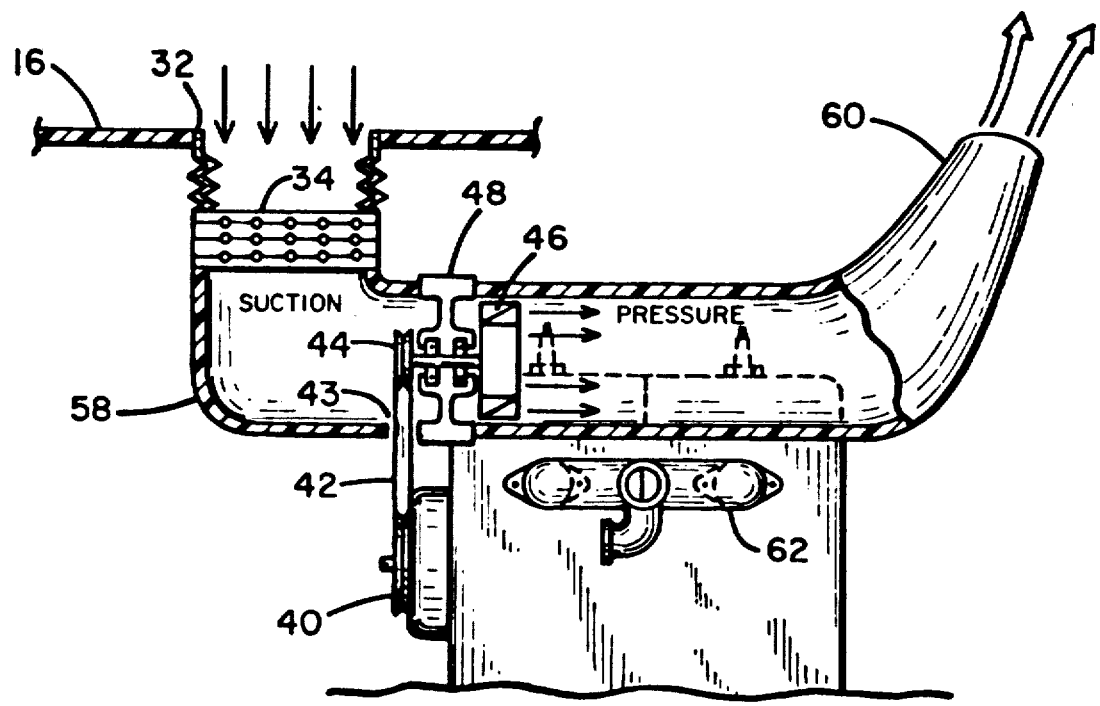
FIG. 3A is a view of a portion of the heat management system incorporated in the snowmobile of FIG. 1 showing one way of locating a fan.

Referring first to FIG. 1, there is indicated generally by numeral 10, a snowmobile-type vehicle which includes a frame assembly including a main frame member 12 whose cross-section is substantially an inverted U-shape with a bottom cover 14 fixed on the underside of a forward portion of the main frame and a cowl 16 made of, for example, FRP (fiber reinforced plastics) and pivotally connected at 18 to a forward end of the bottom cover 14. Affixed to the main frame 12 is a longitudinally elongated seat member 20 on which a driver may sit.

Located below the main frame 12 are plural pairs of guide wheels as at 22 and a pair of guide rails 24 are supported on the main frame in a well-known manner. While not shown in FIG. 1, in the forward section of the snowmobile is disposed a drive sprocket wheel and an endless belt or track 26 having a plurality of transversely extending projections on its outer face is stretched over the guide wheels 22, the guide rails 24 and the drive sprocket wheel, all in a conventional manner. The drive sprocket wheel is, in turn, driven by an engine through a variable speed transmission in a manner which will be described with greater particularity hereinbelow.

The drive track assembly is disposed within the U-shaped main frame member 12 directly below the seat 20 in a zone commonly referred to as the "tunnel". A dampened suspension system supports the drive track assembly to the frame allowing relative vertical movement between the drive track assembly and the frame, thereby isolating the rider from undue shock as the vehicle traverses rough terrain.

Suspended from the forward portion of the frame are steerable skis as at 28, the skis being coupled through a conventional tie bar linkage to a steering column (not shown). The steering column can be rotated by appropriate lateral rotation of the vehicle's handlebars 30.

With continued reference to FIG. 1, it can be seen that the hood or cowl 16 includes a louvered air inlet opening 32 disposed on the right-hand side thereof at a predetermined location which is generally in alignment with a radiator 34 shown in FIG. 2. FIG. 2 illustrates a portion of the snowmobile of FIG. 1 with the hood 16 removed to expose the engine and heat management system comprising the present invention. While the air inlet opening 32 is shown as passing through the hood, those skilled in the art will appreciate that the opening may be made in the other panels defining the vehicle's engine compartment.

Mounted to the frame 12 within the engine compartment is a multi-cylinder (two) internal combustion engine which is identified by numeral 36 and, as can best be seen in the engine side view of FIG. 5, it includes a transversely extending output shaft 38. A pulley 40 is secured to the shaft and trained about the pulley 40 is an endless V-belt 42 which also passes around a fan drive pulley 44 which is affixed to the drive shaft of a fan impeller 46 (FIG. 2) which is journaled for rotation in a fan housing 48. The V-belt 42 is also trained about a pulley 50 (FIG. 5) secured to the shaft of a water pump 52.

As indicated in FIG. 2, the radiator or heat exchanger 34 is conventional in that it comprises a plurality of metal tubes extending between an inlet header 54 and an outlet header 56, thereby providing parallel liquid coolant flow paths. Extending transversely to the plural tubes are a large plurality of closely-spaced conductive metal fins which are joined to the metal tubes of the radiator. As air passes over and between the fins, heat energy is transferred to the air stream, thereby effecting a cooling of the liquid coolant passing through the heat exchanger member 34. The shroud is shown broken away in FIG. 2 to allow viewing of the fan assembly 46 and 48 which is also surrounded by the shroud. The shroud 58 terminates in a duct segment 60 of generally circular cross-section. The air passing through the duct 60 may exit through a suitable grill (not shown) formed in the dashboard of the snowmobile vehicle so as to be directed upon the rider to provide some measure of warmth and comfort if desired Alternatively, the warmed air can be made to exit through an opening (not shown) in the hood or other body panel.

Located beneath the duct 60 in FIG. 2 is an exhaust manifold 62 and, for a two cylinder engine 36, as illustrated, it may comprise a Y-shaped pipe for collecting exhaust gases from each cylinder and conveying those gases to an exhaust pipe 64. It has been found that heat radiated from the exhaust manifold in conventional, prior art snowmobiles is a major contributor to the under-the-hood heat present in the engine compartment. In the snowmobile of the present invention, not only are the cylinder block and cylinder heads of the engine liquid cooled, but so too is the exhaust manifold. The manner in which this is accomplished will next be explained.

Figure 3B:
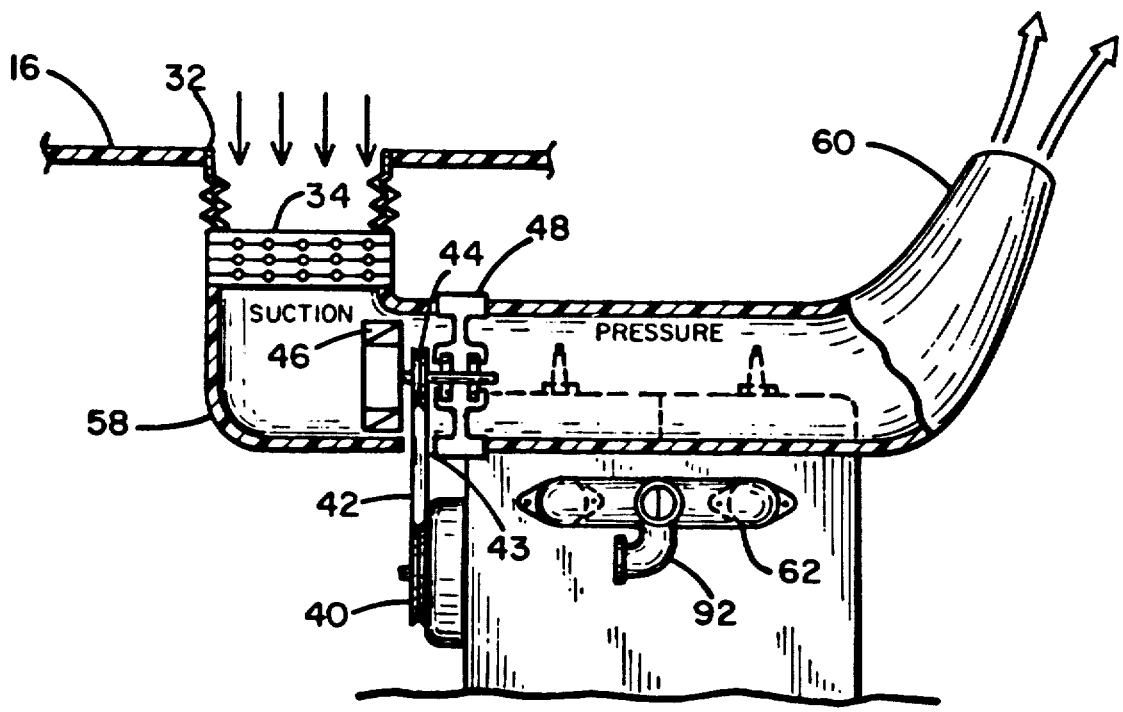
FIG. 3B is a view of a portion of the heat management system showing an alternative way of locating the fan.

Referring to FIG. 3A, there is shown a front elevation of a portion of the heat management system where the opening through the duct or shroud 58 to accommodate the drive belt 42 is on the suction side of the fan 46. Specifically, two holes as at 43 are provided through the shroud 58, allowing the V-belt 42 to extend from the motor drive pulley 40 to the fan pulley 44. Since the openings 43 are on the suction side of the fan 46, a relatively small amount of air from under the hood is allowed to pass and it relieves or compromises the suction generated by the fan 46, thereby decreasing the air flow across the radiator 34. By reversing the orientation of the fan 46 as shown in FIG. 3B, the openings 43 through which the V-belt 42 passes now are on the high pressure side of the fan which does not compromise the amount of outside air flowing through the radiator 34. Thus, while the arrangement shown in FIG. 3A remains totally feasible, that shown in FIG. 3B has been shown to be slightly more efficient in terms of the volume of air which can be drawn across the heat exchanger or radiator 34 for a given size fan.

Referring to FIGS. 4 and 5, the liquid coolant flow path will next be explained. As can be seen in FIG. 4, a radiator hose 66 joins the radiator's outlet header 56 to the suction side of the water pump 52 while hose 68 joins the water pump's outlet to the coolant inlet connector 70 attached to the engine block 72 (FIG. 5). Coolant then traverses the coolant passages (not shown) formed in the block 72 and then exit the block, via pipe 74. The pipe 74 has a coolant liquid filler cap 76 at the upper end thereof and two branches 78 and 80 lead to the cylinder heads 82 and 84, respectively. The coolant liquid flows through passages formed in the heads 82 and 84 and then exits the head via hoses 86 and 88, respectively. Hoses 86 and 88 lead to a water jacket 90 surrounding the Y-pipe (exhaust manifold) 62. In the arrangement of FIGS. 4-6, the Y-pipe assembly comprises an inner tubular member 63 which carries the exhaust gases and a coaxially disposed outer member 90 which is spaced from the inner member to provide a liquid coolant passage surrounding the exterior of the inner pipe 63. The liquid coolant exiting the heads 82 and 84, thus flows through the hoses 86 and 88 into the space between the inner and outer tubes to flood that space with liquid coolant. The coolant exits the Y-pipe assembly 62, via a plumbing outlet 92, leading to a thermostat valve 94 which operates in a conventional fashion to open upon reaching a predetermined upper temperature and allowing the coolant to flow through a further hose 96 to the radiator's inlet header 54.

As shown in FIG. 7, rather than utilizing two coaxially tubes to create a water packet about the exhaust manifold, it is also possible to cast an exhaust manifold so as to incorporate internal passages in the wall thereof.

In operation, as the engine 36 drives the water pump 52, a liquid coolant is circulated through the cooling passages in the engine block 72, the cylinder heads 82 and 84 and through the water jacket surrounding the exhaust manifold 62. This coolant also circulates through the radiator 34. Cold outside air is drawn through the louvered opening 32 formed in the hood and through and over the fins of the radiator 34. The air is drawn by the engine-driven fan 46 from the shroud 58 and forced out through the duct 60 and then expelled out of the hood. Because the duct or shroud 58 totally encloses the suction side of the radiator, there is substantially no leakage of warm under-the-hood air into the air stream, to thereby reduce the effective cooling air flowing through the radiator surfaces. Hence, neat transfer efficiency is optimized. Moreover, because the exhaust manifold 62 is also liquid-cooled, the under-the-hood air temperature is significantly reduced over what would otherwise prevail when the exhaust header is not so cooled. By properly managing the air temperature under-the-hood, problems such as vapor locks and bogging no longer occur. Also, the need for large, multiple hood openings and costly heat insulating material is eliminated.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. In a snowmobile of the type including a frame, a body supported on said frame, said body including an engine compartment and a hood secured to said body in covering relation with respect to said engine compartment, an internal-combustion engine mounted in said engine compartment, said engine including an output shaft and liquid coolant passages extending through a cylinder block and cylinder head, the improvement comprising:

(a) an air inlet opening formed through the thickness dimension of said body at a predetermined location relative to said engine compartment;
    (b) a radiator of the type including tube means held in spaced relation by a plurality of heat conducting fins for conveying a coolant liquid therethrough and disposed in said engine compartment in generally sealed relation with and proximate said air inlet opening in said body;
    (c) fan means operatively coupled to said output shaft for forcing air entering said opening over said heat conducting fins at a rate substantially proportional to the generated engine heat output;
    (d) sealed duct means disposed in said engine compartment and including a first portion surrounding said fan and said radiator for effectively excluding air in said engine compartment external of said duct means from the air stream being moved over said heat conducting fins by said fan, said first portion maintaining a negative pressure between said radiator and said fan for drawing air through said heat conducting fins;
    (e) said sealed duct means having a second portion downstream of said fan for exhausting heated air to the ambient;
    (f) coolant pump means operatively coupled to said output shaft to be driven by said shaft, said pump having a suction inlet and a pressure outlet;
    (g) hose means for coupling said inlet and outlet of said coolant pump means in fluid circuit with said tube means of said radiator and with said liquid coolant passages in said cylinder block and cylinder head, and (h) an exhaust connection attached to said engine within said engine compartment for carrying exhaust gases from one or more cylinders of said engine to an exhaust pipe, said exhaust connection having liquid coolant passages within the walls thereof, said liquid coolant passages of said exhaust connection being in said fluid circuit and isolated from said exhaust gases.

2. The snowmobile as in claim 1 wherein said second portion of said duct means includes an outlet external of said engine compartment.

3. The snowmobile as in claim 1 wherein said exhaust connection comprises a generally Y-shaped tube and said liquid coolant passages are formed in the walls of said Y-shaped tube.

4. The snowmobile as in claim 1 wherein said exhaust connection includes first and second coaxially disposed, spaced-apart tubes, exhaust gases passing through the center of the innermost tube and said liquid coolant flowing through the center of the outermost tube.

5. The snowmobile as in claim 1 wherein said hood is in covering relation relative to said engine compartment and said air inlet opening is formed in said hood.

* * * * *